(12) United States Patent
Strobel et al.

(10) Patent No.: US 10,946,415 B2
(45) Date of Patent: Mar. 16, 2021

(54) SHAKER ASSEMBLIES HAVING A VIBRATORY SCREEN CLAMPING SYSTEM

(71) Applicant: Vermeer Manufacturing Company, Pella, IA (US)

(72) Inventors: Andrew Albert Strobel, Knoxville, IA (US); Daniel John Hofland, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 61 days.

(21) Appl. No.: 16/389,607

(22) Filed: Apr. 19, 2019

(65) Prior Publication Data

US 2019/0329295 A1    Oct. 31, 2019

Related U.S. Application Data

(60) Provisional application No. 62/664,569, filed on Apr. 30, 2018.

(51) Int. Cl.
| | |
|---|---|
| *B65G 27/08* | (2006.01) |
| *B07B 1/40* | (2006.01) |
| *B01D 46/00* | (2006.01) |
| *B07B 11/04* | (2006.01) |
| *B01D 12/00* | (2006.01) |
| *B07B 1/42* | (2006.01) |

(52) U.S. Cl.
CPC ............... *B07B 1/40* (2013.01); *B01D 12/00* (2013.01); *B01D 46/0075* (2013.01); *B07B 11/04* (2013.01); *B01D 2265/028* (2013.01); *B07B 2201/02* (2013.01)

(58) Field of Classification Search
CPC .............. B65G 27/08; B07B 1/40; B07B 1/42
USPC ............... 198/752.1, 759; 209/241, 322, 329
See application file for complete search history.

(56) References Cited

U.S. PATENT DOCUMENTS

| | | | |
|---|---|---|---|
| 3,469,695 A | 9/1969 | Greeninger | |
| 4,224,146 A | 9/1980 | Kent et al. | |
| 4,632,751 A | 12/1986 | Johnson et al. | |
| 4,634,535 A | 1/1987 | Lott | |
| 5,368,167 A * | 11/1994 | Howes ...................... | B07B 1/12 |
| | | | 198/759 |
| 6,283,303 B1 | 9/2001 | Lane et al. | |
| 6,892,889 B2 | 5/2005 | Hukki et al. | |
| 7,175,027 B2 | 2/2007 | Strong et al. | |
| 7,451,869 B2 * | 11/2008 | Kato ...................... | B65G 27/02 |
| | | | 198/750.8 |

(Continued)

FOREIGN PATENT DOCUMENTS

| | | |
|---|---|---|
| CA | 711097 A | 9/1969 |
| CN | 203709212 U | 7/2014 |

OTHER PUBLICATIONS

"DCS585-4 Shale Shake & Mi-Swaco Mongoose Shaker", dc_admin, Drill Mud Cleaning System, Mud treatment introduction, Nov. 24, 2014, http://www.dccleaningsystem.com/dcs585-4-shale-shaker-mi-swaco-mongoose-shaker/, 3 pages.

(Continued)

*Primary Examiner* — Douglas A Hess
(74) *Attorney, Agent, or Firm* — Armstrong Teasdale LLP

(57) ABSTRACT

Shaker assemblies for dewatering are disclosed. The shaker assemblies may include a clamping system for securing a vibratory screen of the shaker assembly.

15 Claims, 19 Drawing Sheets

(56) References Cited

U.S. PATENT DOCUMENTS

| | | | |
|---|---|---|---|
| 7,520,391 B2 | 4/2009 | Schulte, Jr. et al. | |
| 7,523,570 B2 | 4/2009 | Pobihushchy | |
| 7,810,632 B2 * | 10/2010 | Ohashi | B65G 27/34 198/720 |
| 7,857,123 B2 * | 12/2010 | Fuyama | B65G 27/20 198/769 |
| 8,464,861 B2 * | 6/2013 | Bonn | B65G 27/20 198/758 |
| 8,517,168 B2 * | 8/2013 | Hufford | B65G 27/10 198/752.1 |
| 8,733,540 B2 * | 5/2014 | Woiler | B65G 27/28 198/766 |
| 8,978,894 B1 | 3/2015 | Woiler et al. | |
| 9,254,965 B2 * | 2/2016 | Groenewald | B65G 27/04 |
| 9,452,890 B2 * | 9/2016 | Spaulding | B65G 27/24 |
| 2016/0177644 A1 | 6/2016 | Tooley et al. | |
| 2016/0228917 A1 | 8/2016 | Woodgate et al. | |
| 2019/0017243 A1 | 1/2019 | Strobel et al. | |

OTHER PUBLICATIONS

"Mongoose Pro Shaker", M-I SWACO, DBR.1314.1304.R4 (3), 2013, 12 pages.

* cited by examiner

SHAKER ASSEMBLIES HAVING A VIBRATORY SCREEN CLAMPING SYSTEM

CROSS-REFERENCE TO RELATED APPLICATION

This application claims the benefit of U.S. Provisional Patent Application No. 62/664,569, filed Apr. 30, 2018, which is incorporated herein by reference it its entirety.

FIELD OF THE DISCLOSURE

The field of the disclosure relates to shaker assemblies for dewatering slurries and, in particular, to shaker assemblies having clamping systems for securing a vibratory screen of the shaker assembly.

BACKGROUND

Shaker assemblies may be used to separate material and/or to dewater slurry from an excavation site as part of a hydro excavation vacuum system. Shaker assemblies typically include at least one vibratory screen that is subject to wear and damage from routine use and that are replaced routinely. Additionally, the vibration of the shaker assembly may cause the screen to come loose. Replacement of the vibratory screen may require substantial time to loosen the screen securing apparatus, remove the worn shaker screen from the shaker assembly, and to install the new shaker screen correctly and securely. Drilling fluid reclaimer systems may also include shaker assemblies having screens that are routinely replaced.

A need exists for clamping systems that rapidly and securely clamp a vibratory screen to the shaker assembly to increase efficiency.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a shaker assembly for dewatering material. The shaker assembly includes a vibratory screen, a vibratory frame, a clamping bar, and a rotatable cam. The vibratory frame has a mounting surface for supporting the vibratory screen. The vibratory screen is disposed on the mounting surface. The clamping bar extends along a side of the vibratory screen. The rotatable cam contacts the clamping bar during rotation of the cam to move the clamping bar between an unclamped position in which the vibratory screen is not secured against the mounting surface and a clamped position in which the vibratory screen is secured against the mounting surface.

Another aspect of the present disclosure is directed to a clamping system for securing a vibratory screen. The clamping system includes a mounting surface for supporting the vibratory screen. The clamping system includes a clamping bar for securing the vibratory screen to the mounting surface. The clamping system includes a rotatable cam that rotates to cause the clamping bar to move to a clamping position to secure the vibratory screen to the mounting surface. The clamping system includes a shaft connected to the rotatable cam, the shaft being rotatable to cause the cam to rotate.

Yet a further aspect of the present disclosure is directed to a hydro excavation vacuum apparatus for excavating earthen material. The hydro vacuum apparatus includes a wand for directing pressurized water toward earthen material at an excavation site. The hydro vacuum apparatus includes a vacuum system for removing cut earthen material and water from the excavation site in an airstream. The hydro vacuum apparatus includes a shaker assembly for separating water from cut earthen material. The shaker assembly includes a subframe, a vibratory screen, a vibratory frame, and a clamping bar. The vibratory frame is movable relative to the subframe and has a mounting surface for supporting the vibratory screen. The vibratory screen is disposed on the mounting surface. The clamping bar extends along a side of the vibratory screen and is movable between an unclamped position in which the vibratory screen is not secured against the mounting surface and a clamped position in which the vibratory screen is secured against the mounting surface.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
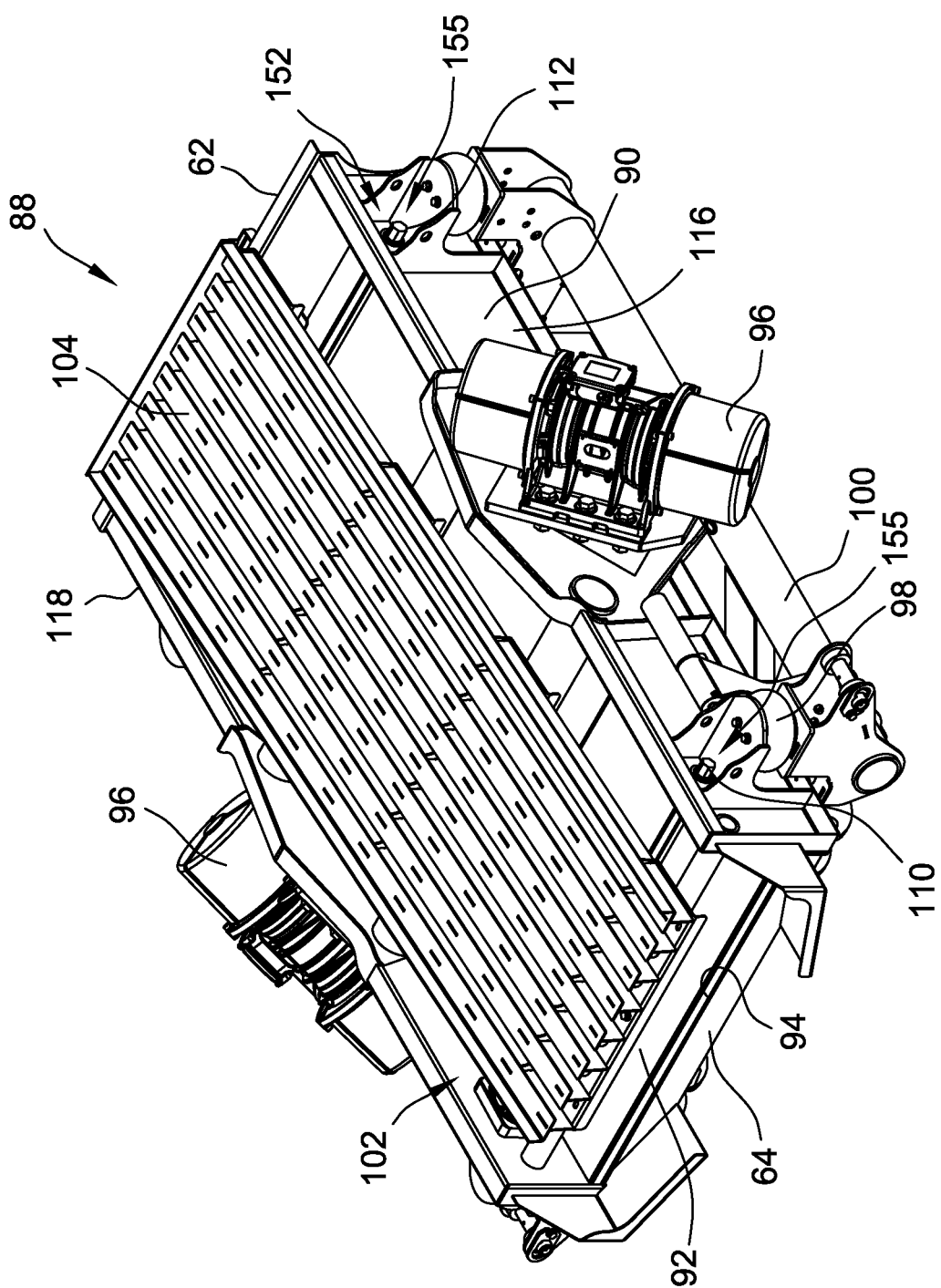
FIG. 1 is a perspective view of a shaker assembly.
Figure 2:
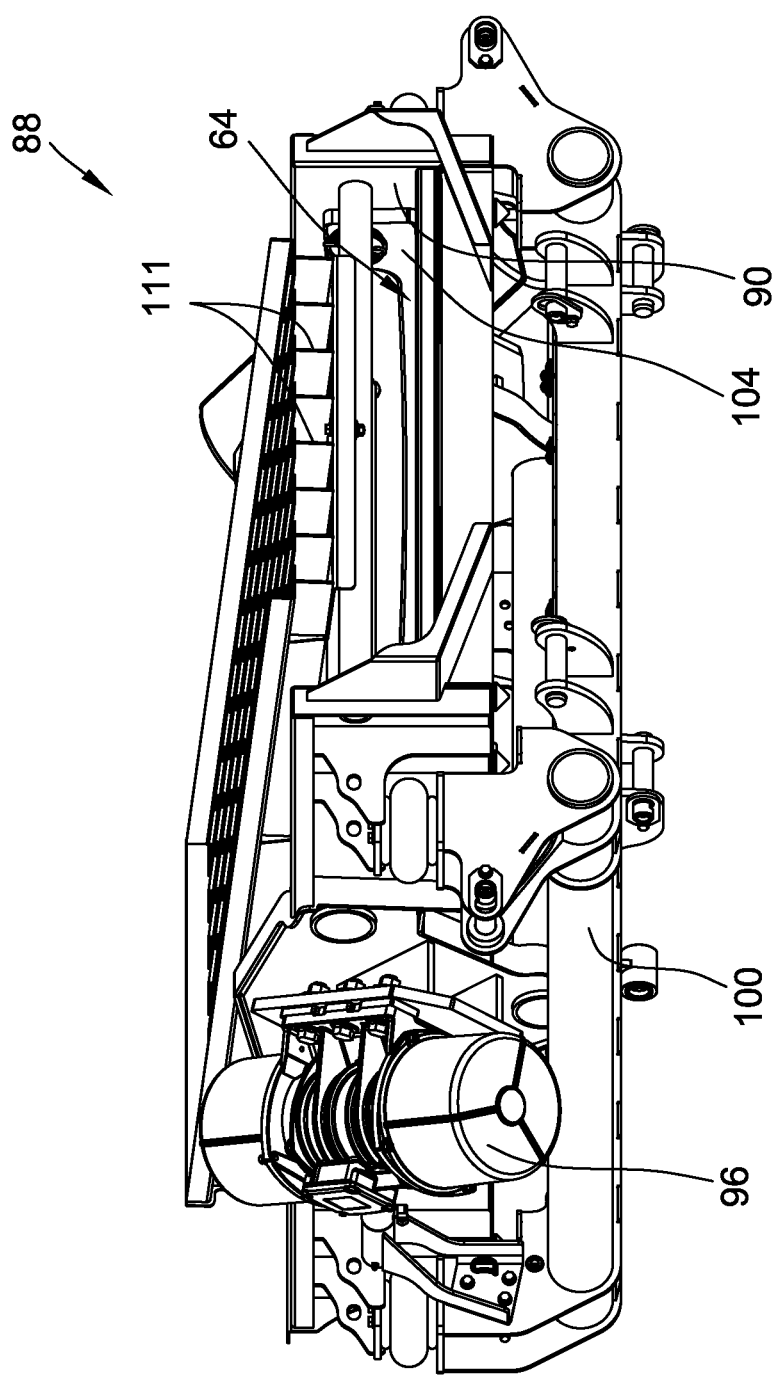
FIG. 2 is another perspective view of the shaker assembly.
Figure 3:
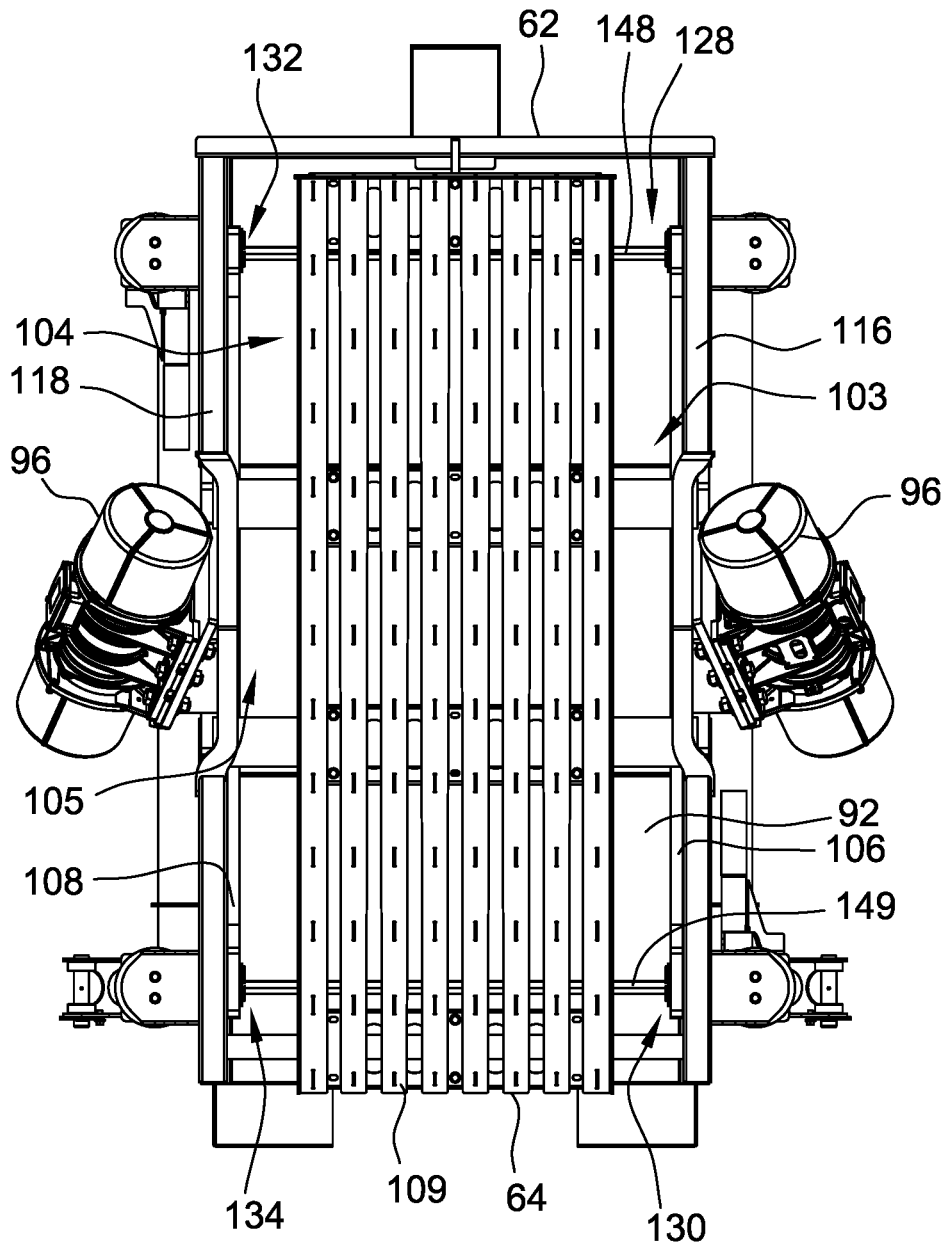
FIG. 3 is a top view of the shaker assembly.
Figure 4:
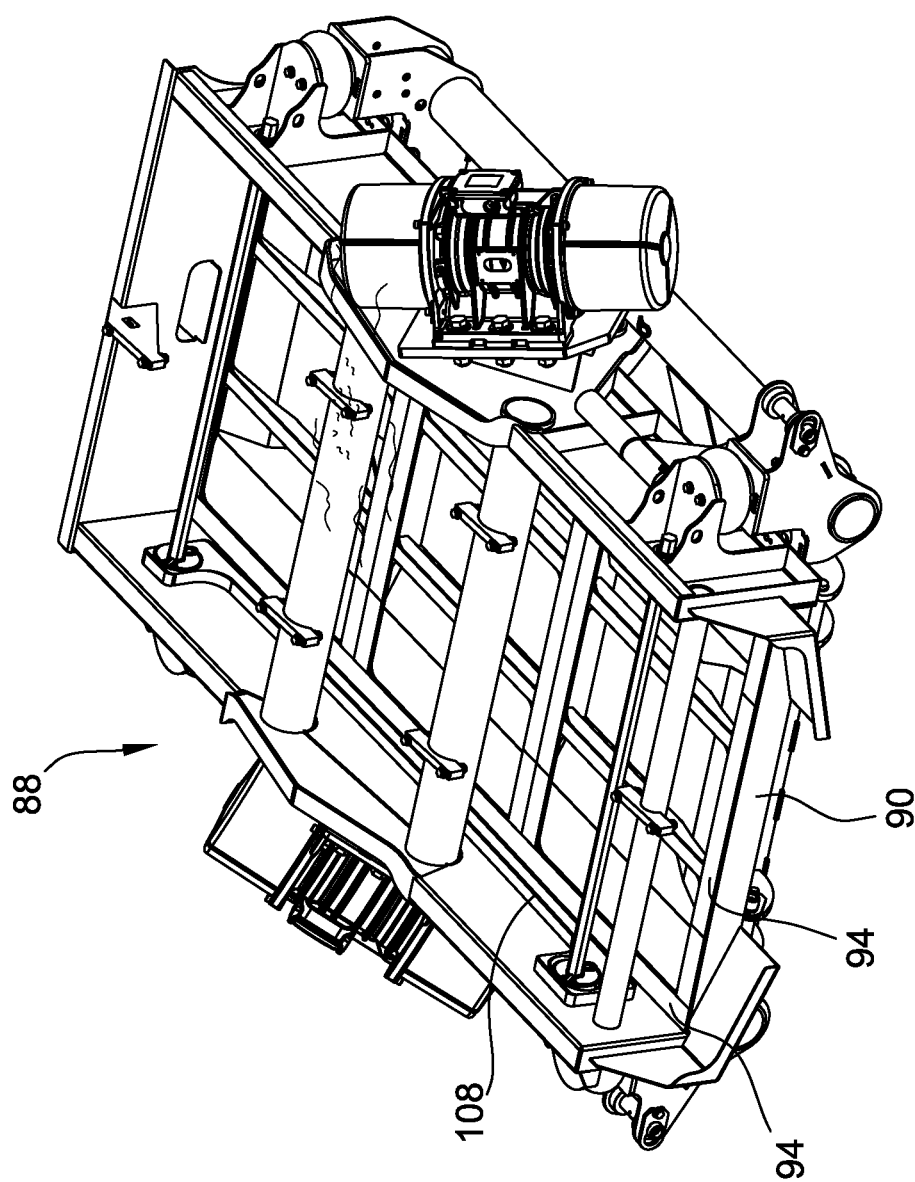
FIG. 4 is a perspective view of the shaker assembly without a screen.

An example shaker assembly 88 (which may also be referred to more simply as a "shaker") for dewatering an excavation slurry is shown in FIGS. 1-4. The shaker assembly 88 may generally be any apparatus in which material is dewatered and/or material is separated by size by action of a vibrating screen. Such shaker assemblies may be used in a hydro excavation vacuum apparatus such as the apparatus 12 of FIG. 13-17 or in a drilling fluid reclaimer system 160 such as the system of FIG. 19.

The shaker assembly 88 includes a vibratory frame 90 that supports a vibratory screen 92. The vibratory screen 92 includes openings with smaller material passing through the openings and larger material passing over the screen. A subframe 100 supports the vibratory frame 90 and is connected to the vibratory frame 90 by one or more isolation devices 98. The term "subframe" as used herein generally refers to any structure which supports the vibratory frame 90. In the illustrated embodiment, the subframe 100 pivots to level the shaker assembly 88. The subframe 100 is supported by a mainframe 172 (FIG. 17) such as the mainframe of a vehicle which carries the shaker assembly 88. In some embodiments, the subframe 100 is part of the mainframe itself (e.g., such as when the leveling frame is eliminated).

Vibratory motors 96 are connected to the vibratory frame 90 and are configured to move the vibratory screen 92 linearly or in an elliptical path (e.g., by arranging the number of motors, orientation of the motors, and/or placement of the motors to move the vibratory screen 92 linearly or in an elliptical path). In other embodiments, the shaker assembly 88 includes a single vibratory motor 96 or more than two vibratory motors 96.

The isolation device 98 is connected to the vibratory frame 90 and to the subframe 100 for isolating the vibration transferred from the vibratory frame 90 to the subframe 100. The term "isolation" as used herein should be understood to not imply full dampening of the vibration transferred to the subframe 100. In the illustrated embodiment, the isolation device 98 includes four inflatable airbags positioned near each corner of the vibratory frame 90 and corresponding corner of the subframe 100. In other embodiments, the isolation device 98 is one or more rubber isolators, coil springs, cable springs, and/or a lever arm with rubber isolation and torsion control.

Figure 17:
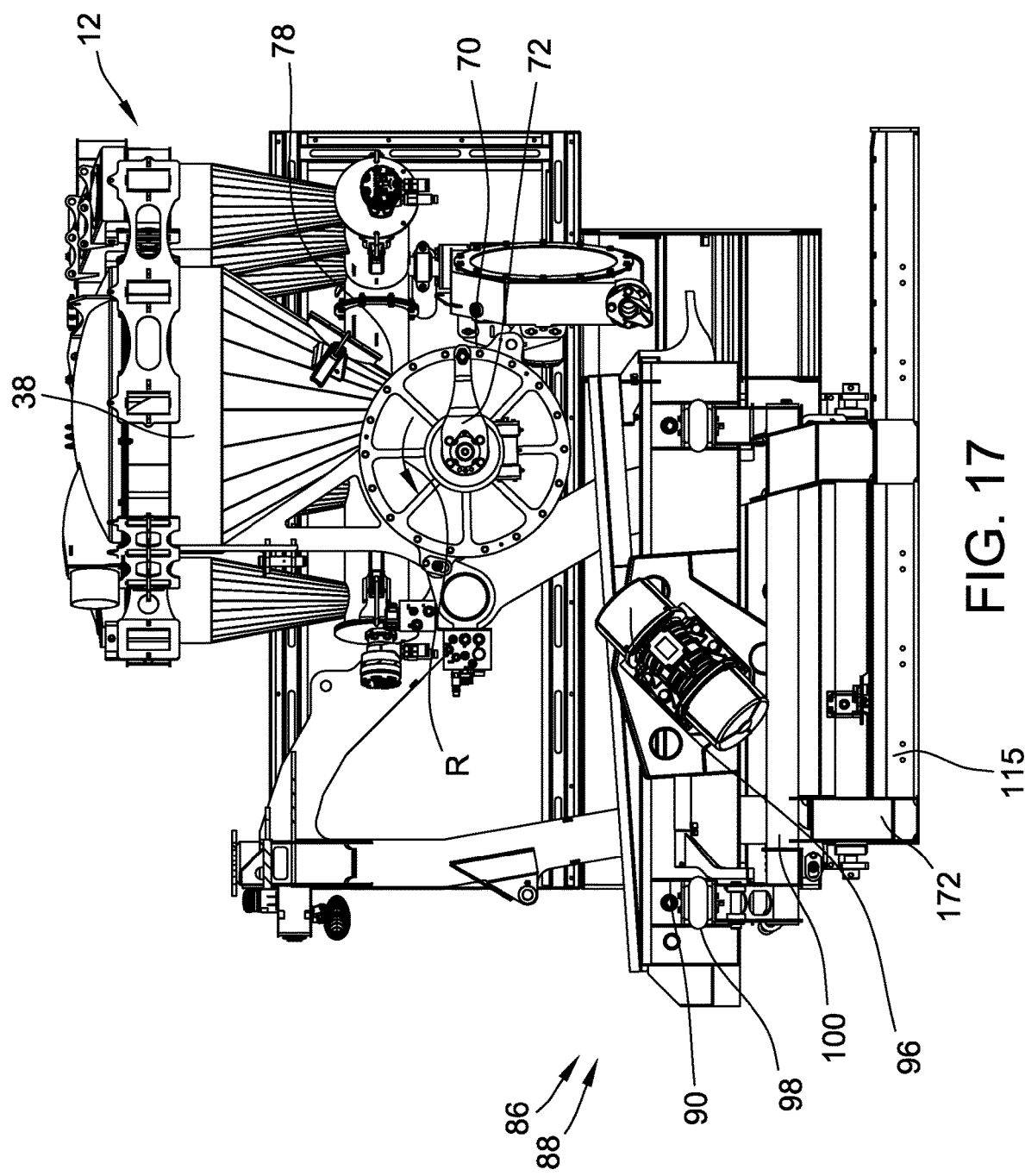
FIG. 17 is side view of the hydro excavation vacuum apparatus illustrating a shaker assembly and separation vessel.

The shaker assembly 88 includes a loading end 62 (FIG. 1) toward which material is loaded on the screen 92 and a solids discharge end 64 at which solid materials carried by the screen 92 are discharged. Material that passes through the screen 92 is collected in a catchpan 115 (FIG. 17). The shaker assembly 88 defines a first side 116 and a second side 118 opposite the first side 116 that extends between the loading end 62 and solids discharge end 64.

The vibratory frame 90 defines one or more mounting surfaces 94 (FIG. 4) for supporting the vibratory screen 92. The vibratory screen 92 (FIG. 1) is disposed on the mounting surface 94. The shaker assembly 88 includes a clamping system 102 (FIG. 5) to secure the screen 92 against the mounting surface 94. The clamping system 102 of some embodiments includes a first clamping bar 106 and a second clamping bar 108 for securing the vibratory screen 92 to the mounting surface 94 of the vibratory frame 90. The first clamping bar 106 and the second clamping bar 108 are moveable between an unclamped position (FIG. 9) in which the vibratory screen 92 is not secured against the mounting surface 94, and a clamped position (FIG. 10) in which the vibratory screen 92 is secured against the mounting surface 94. In the illustrated embodiment, the first clamping bar 106 extends at least partially along a first side 103 (FIG. 3) of the vibratory screen 92 and the second clamping bar 108 extends at least partially along a second side 105 of the vibratory screen 92, the second side 105 being opposite from the first side 103. The first clamping bar 106 and second clamping bar 108 may each partially extend along the first side 103 and the second side 105 of the vibratory screen 92, respectively, or, as in other embodiments, along the entirety of the first side 103 and second side 105 of the screen 92. In some embodiments, the clamping system 102 includes a single clamping bar.

Figure 9:
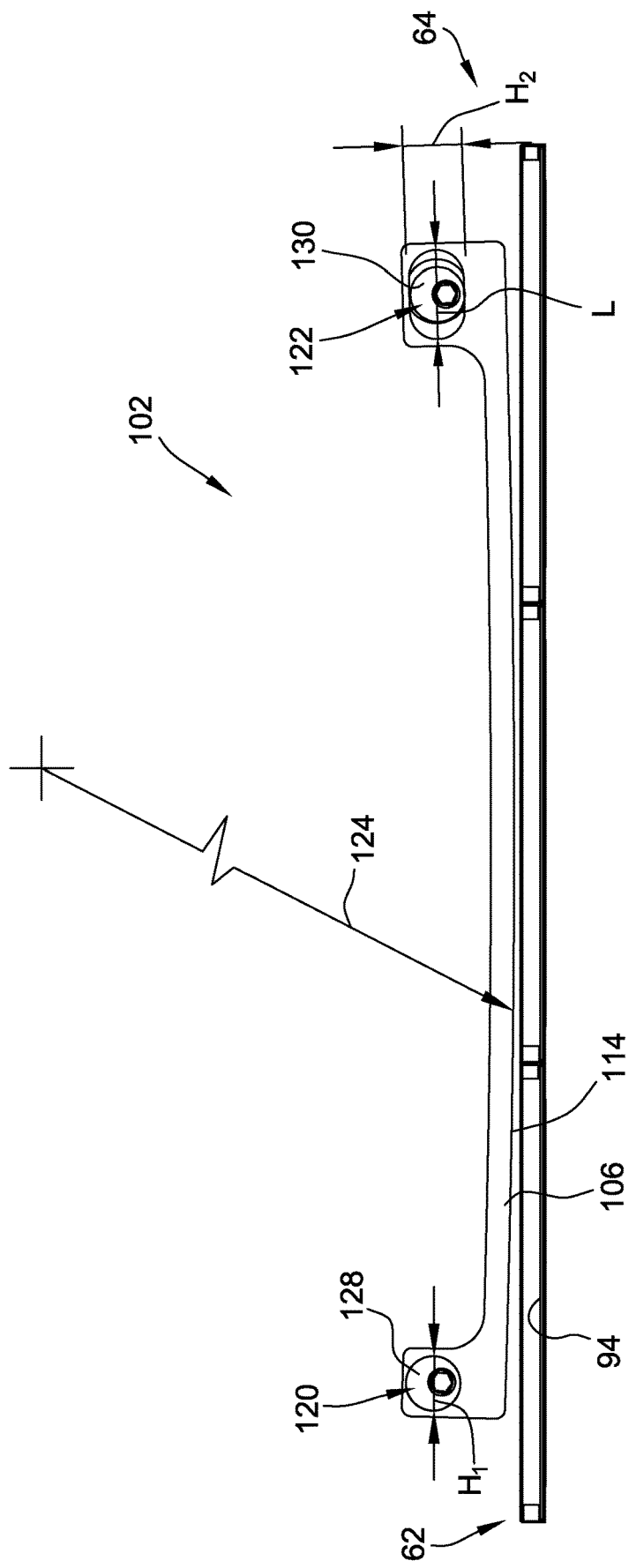
FIG. 9 is a side view of the clamping system in an unclamped position.
Figure 10:
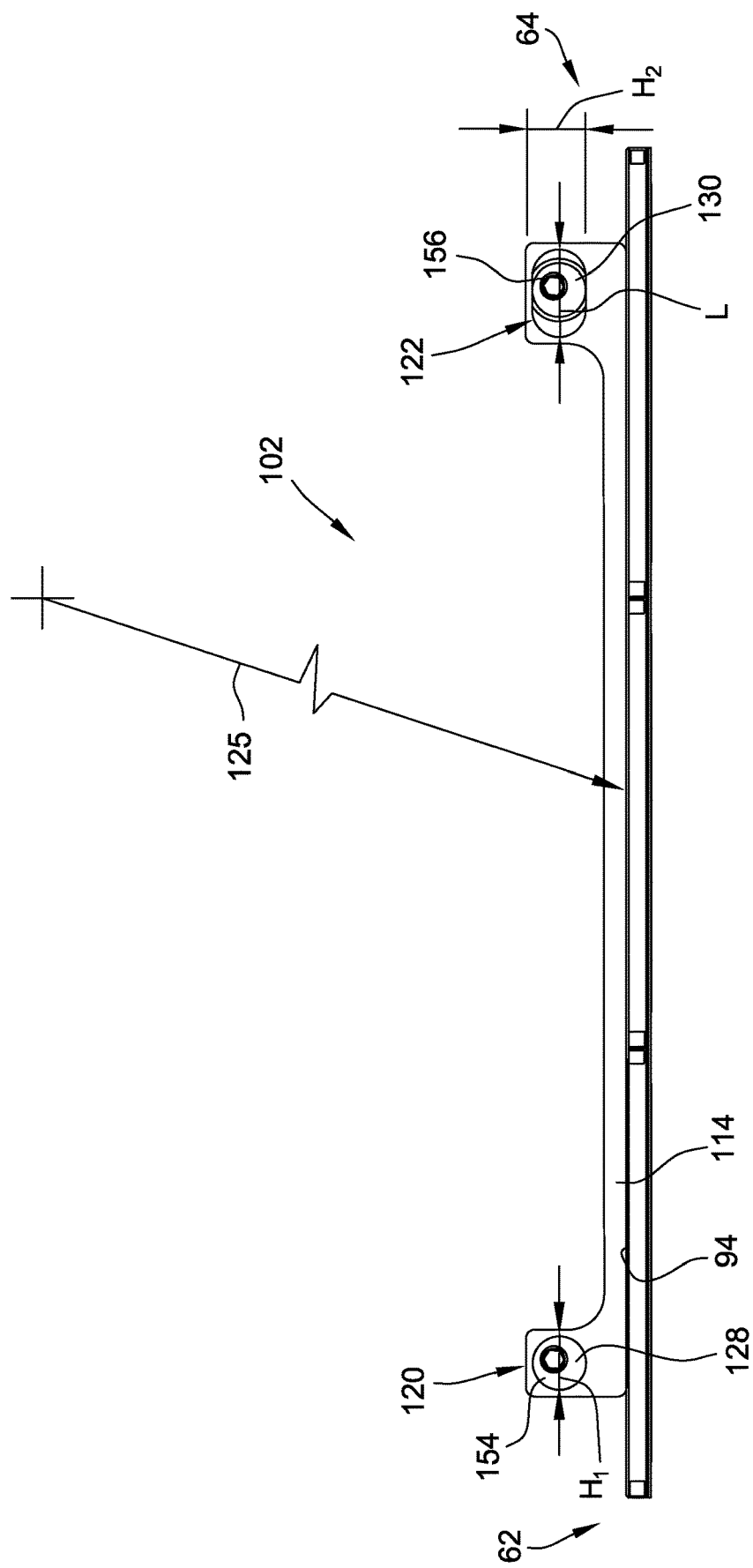
FIG. 10 is a side view of the clamping system in a clamped position.

In the illustrated embodiment, each of the clamping bars 106, 108 includes a first through-hole 120 (FIG. 9) and a second through-hole 122, and has a mounting surface 114 that contacts the vibratory screen 92 during clamping. The mounting surface 114 is convex in the unclamped position and includes a radius of curvature 124. During clamping, each clamping bar 106, 108 elastically deflects (i.e., bends) to increase the radius of curvature of the clamping bar 106, 108 as the clamping bar 106, 108 moves from the unclamped position to the clamped position. In the clamped position (FIG. 10), each clamping bar 106, 108 has a radius of curvature 125 that is greater than the radius of curvature 124 in the unclamped position. For example, the clamping bars 106, 108 may be fully deflected as shown in FIG. 10 (i.e., with an infinite radius 125) or the bars 106, 108 may be partially deflected.

Figure 5:
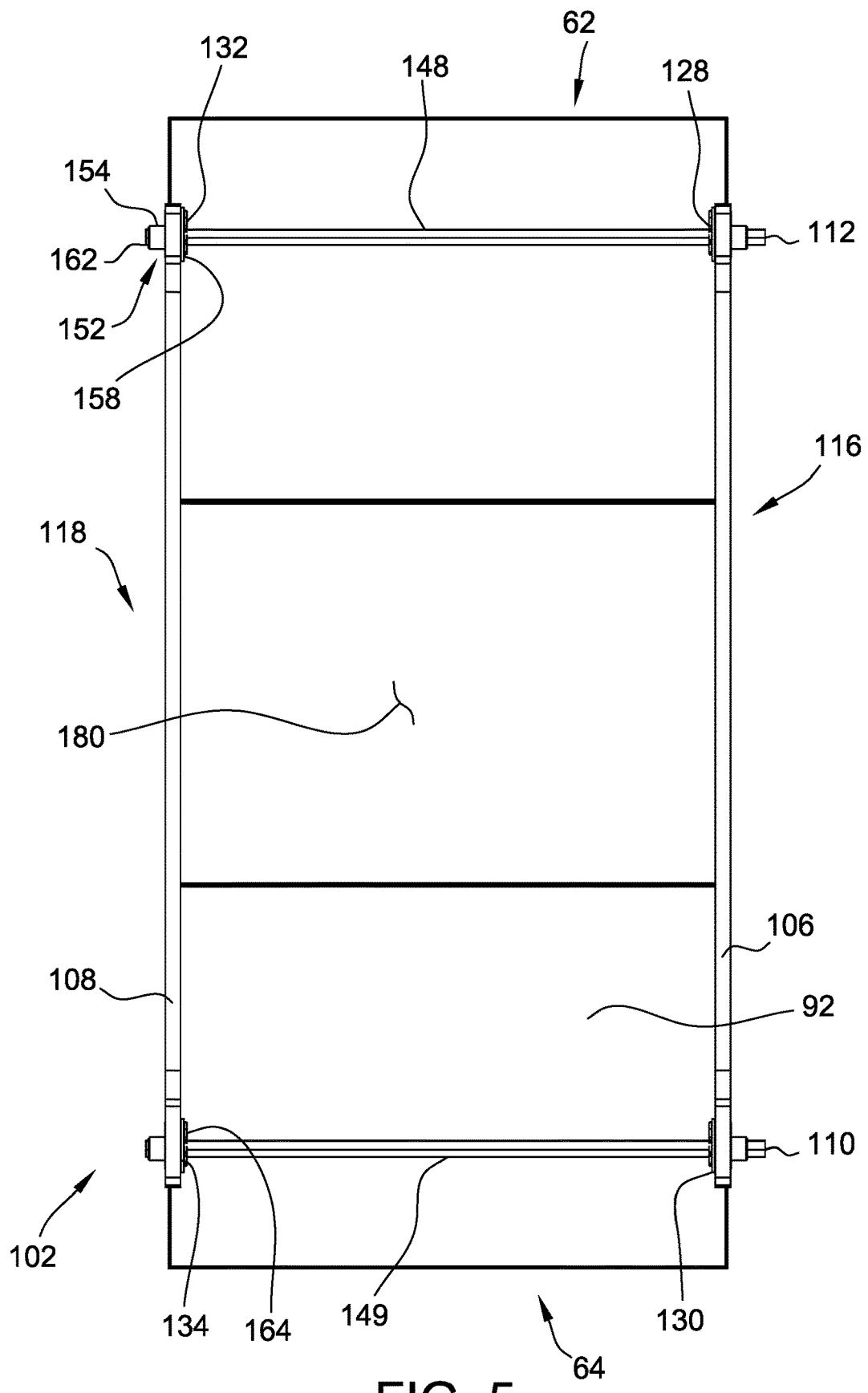
FIG. 5 is a top view of a clamping system that may be used with the shaker assembly.
Figure 12A:
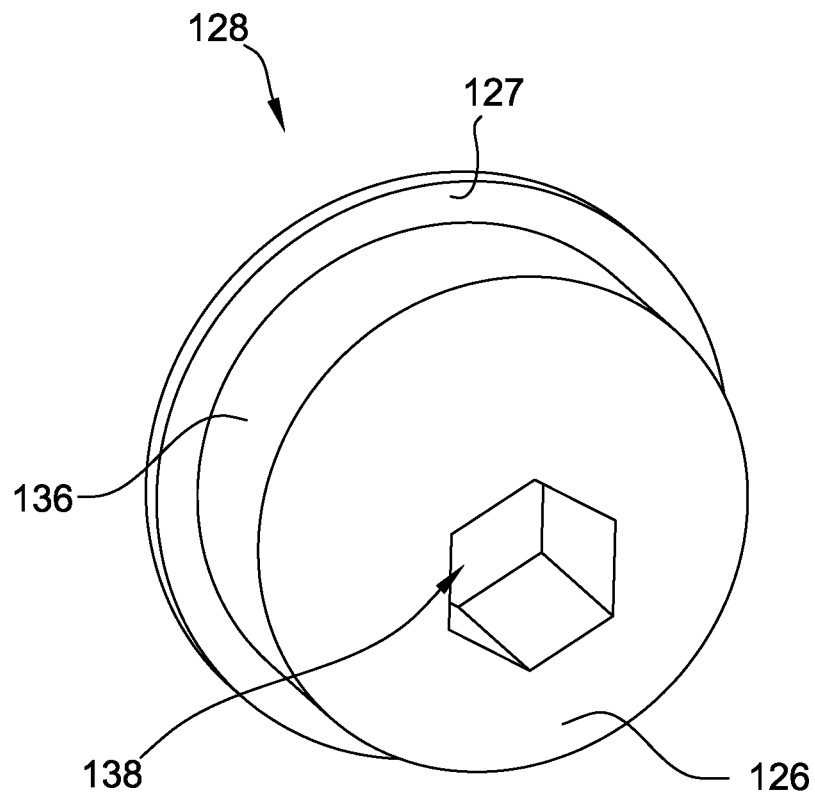
FIG. 12A is a perspective view of a cam that may be used with the clamping system.
Figure 12B:
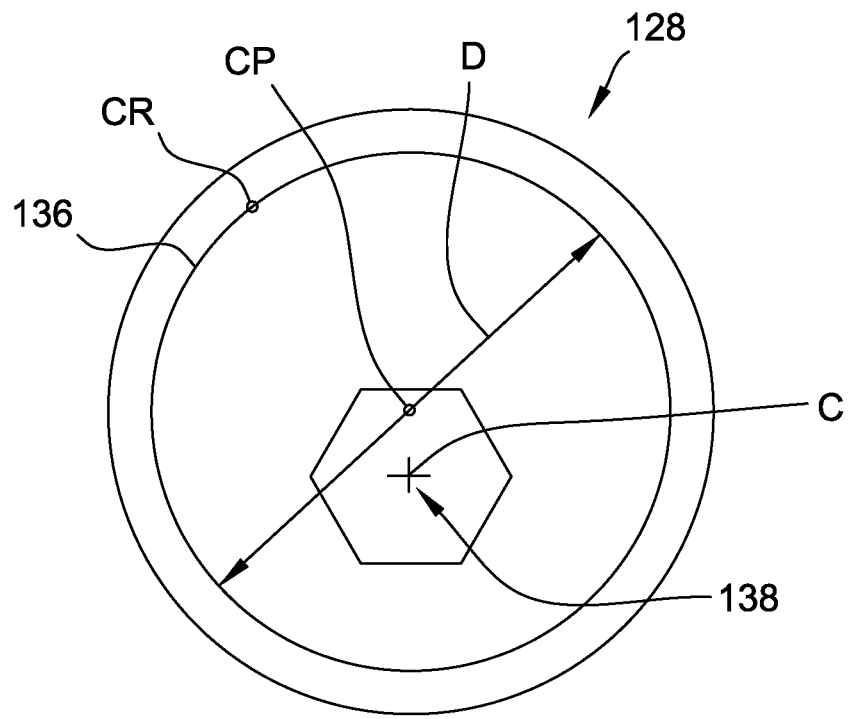
FIG. 12B is a side view of a cam that may be used with the clamping system.

Referring now to FIG. 5, the clamping system 102 includes four rotatable cams. A first rotatable cam 128 and a second rotatable cam 130 each contact the first clamping bar 106. A third rotatable cam 132 and a fourth rotatable cam 134 each contact the second clamping bar 108. The cams 128, 130, 132, 1334 rotate to move the clamping bars 106, 108 between the unclamped position (FIG. 9) and the clamped position (FIG. 10). Each of the rotatable cams 128, 130, 132, 134 includes a symmetrical outer surface 136 (first cam 128 being shown in FIG. 12) that contacts the respective one of the clamping bars 106, 108 during rotation of the rotatable cam. In the illustrated embodiment, the rotatable cams are eccentric cams. That is, each rotatable cam includes a cam through-hole 138 defining an axis of rotation C of the rotatable cam that is offset from the physical center point CP (i.e., center point along the diameter D) of the rotatable cam. Each cam 128, 130, 132, 134 includes a crown CR which is the point on the outer surface 136 of the cam at which the distance from the axis of rotation C to the outer surface 136 is the greatest.

In the illustrated embodiment, cam through-holes 138 have hexagonal perimeters. In some embodiments, rather than being an eccentric cam, the rotatable cams 128, 130, 132, 134 have a non-symmetrical outer perimeter, for instance, an elliptical outer perimeter. In the illustrated embodiment, each rotatable cam 128, 130, 132, 134 includes a retention lip 127 extending from a cam body 126 and configured to cooperate with a shaft retention system 152

(described below) to facilitate retaining the rotatable cam within a respective clamping bar 106, 108.

The first and third rotatable cams 128, 132 (FIG. 5) are received in the first through-holes 120 (FIGS. 9-11) of the first clamping bar 106 and the second clamping bar 108, respectively, with the first rotatable cam 128 being opposite the third rotatable cam 132. The first through-holes 120 are circular and have a first through-hole diameter $H_1$ that is substantially the same as the diameter $D_1$ of the rotatable cams. In some embodiments, first through-holes 120 may have a circular or other configuration of inner perimeter.

Figure 11:
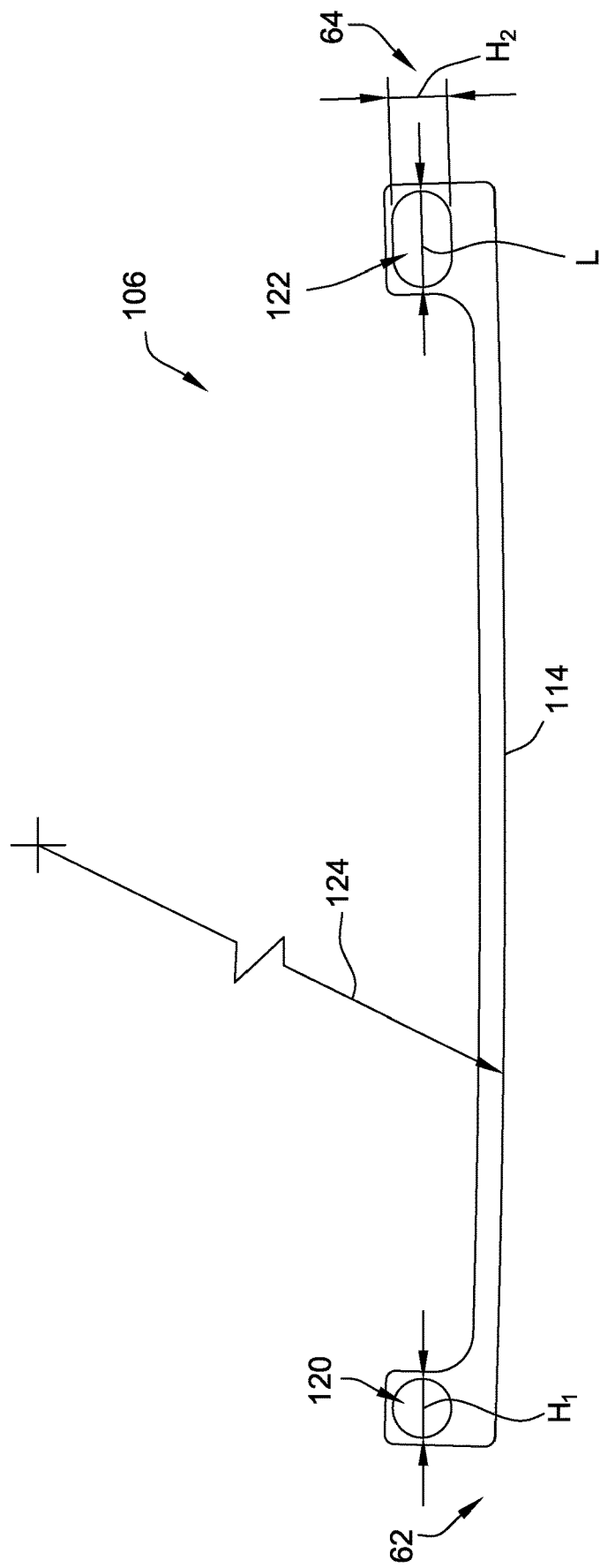
FIG. 11 is a side view of a clamping bar that may be used with the clamping system.

The second and fourth rotatable cams 130, 134 are received in the second through-holes 122 of the first clamping bar 106 and the second clamping bar 108, respectively, wherein the second rotatable cam 130 is opposite the fourth rotatable cam 134. The second through-holes 122 are slotted and have a height $H_2$ that is substantially the same as a diameter $D_1$ of the rotatable cams and a length L that is greater than the diameter $D_1$ of the rotatable cams (FIGS. 9-11). In some embodiments, second through-holes 122 may have a circular or other configuration of inner perimeter.

The clamping system 102 includes a first clamping shaft 148 and a second clamping shaft 149 (FIG. 5). The clamping shafts 148, 149 are connected to the vibratory frame 90 and are rotatable to cause the cams to rotate. The clamping shafts 148, 149 have a hexagonal outer perimeter configured to be received within the cam through-holes 138. The first clamping shaft 148 extends between the first rotatable cam 128 and the third rotatable cam 132 and is configured such that rotation of the first clamping shaft 148 causes the first rotatable cam 128 and the third rotatable cam 132 to rotate. The second clamping shaft 149 extends between the second rotatable cam 130 and the fourth rotatable cam 134 and is configured such that rotation of the second clamping shaft 149 causes the second rotatable cam 130 and the fourth rotatable cam 134 to rotate. The rotation of the rotatable cams causes the clamping bars 106, 108 to move between the unclamped position and the clamped position.

The clamping system 102 includes actuator interfaces 110, 112 (FIG. 5) connected to the first and second clamping shafts 148, 149 for moving the clamping bars 106, 108. In the illustrated embodiment, each actuator interface 110, 112 is a shank (hex shank) to which an actuator (e.g., wrench, handle, socket, or the like) may be attached. In some embodiments, the actuator interface 110, 112 is selected from a fastener, a gear, a shaft, and a recess.

Figure 6:
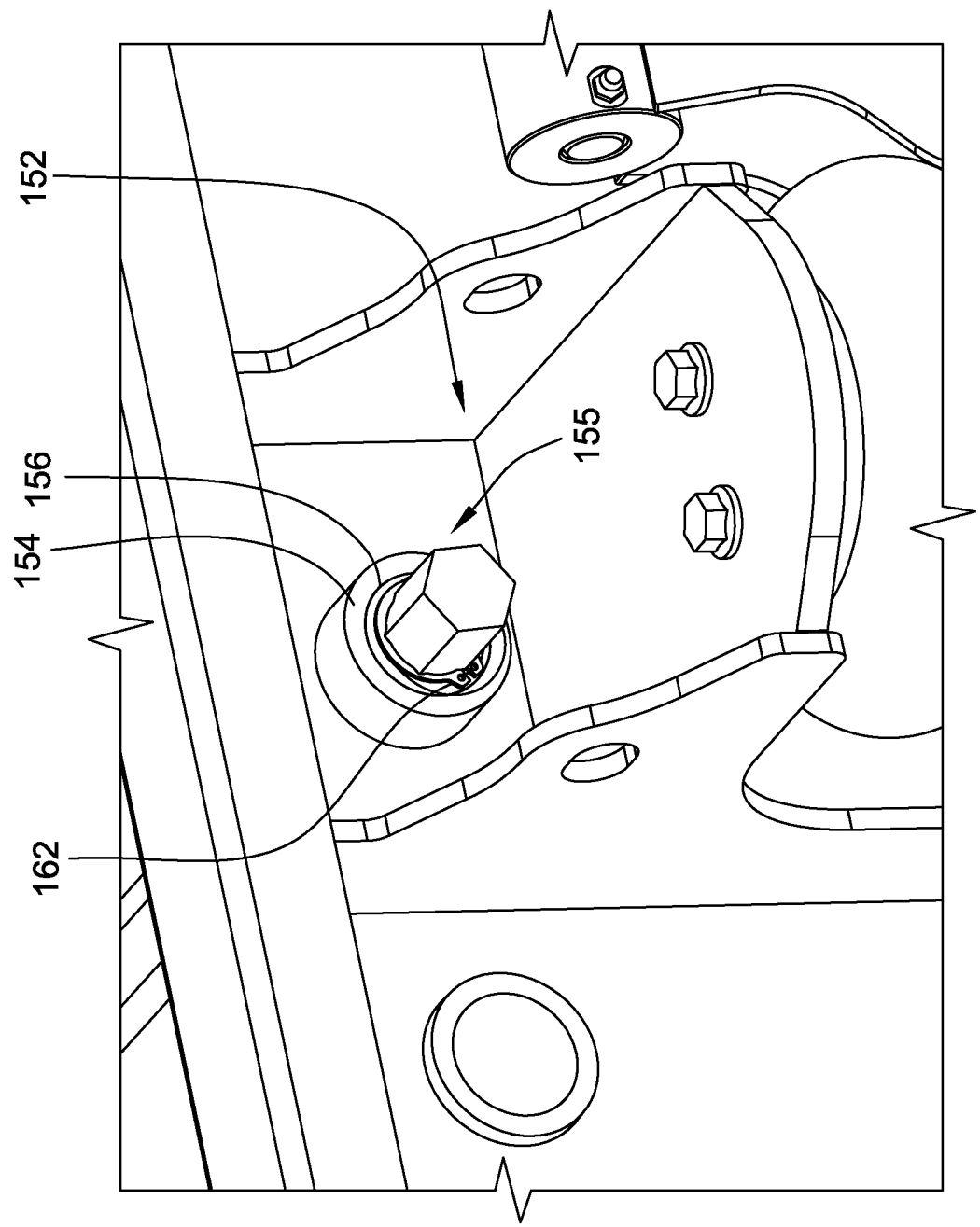
FIGS. 6-7 are detailed perspective views of a shaft retention system of the clamping system.

Each of the clamping shafts 148, 149 extends through cam through-holes 138 (FIG. 12) and through shaft holes 155 (FIG. 6) formed in the first side 116 and a second side 118 of the vibratory frame 90. The first clamping shaft 148 (FIG. 3) extends through the first side 116, through the first rotatable cam 128 and the first clamping bar 106, between the first clamping bar 106 and the second clamping bar 108, through the third rotatable cam 132 and the second clamping bar 108, and finally, through the second side 118. The second clamping shaft 149 extends through the first side 116, through the second rotatable cam 130 and the first clamping bar 106, between the first clamping bar 106 and the second clamping bar 108, through the fourth rotatable cam 134 and the second clamping bar 108, and finally, through the second side 118.

Figure 7:
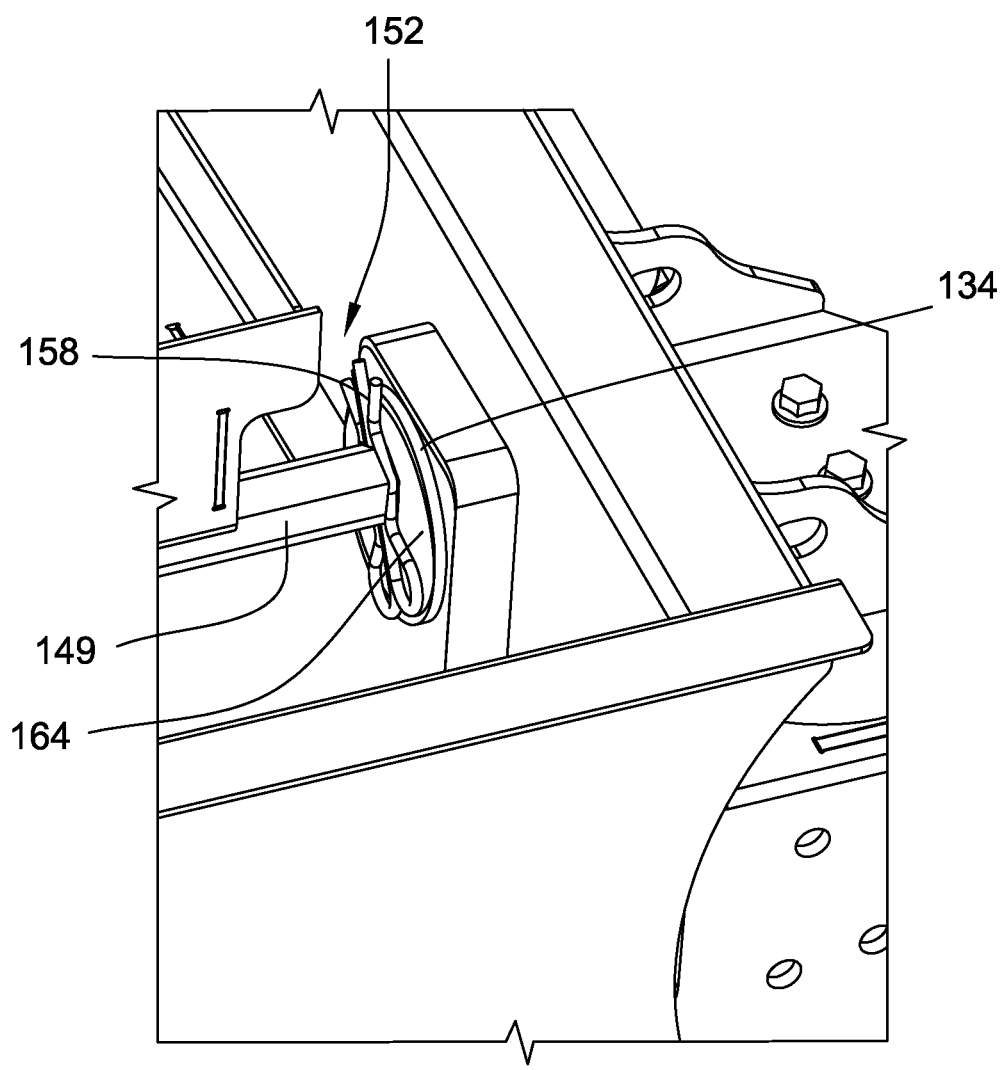
Figure 8:
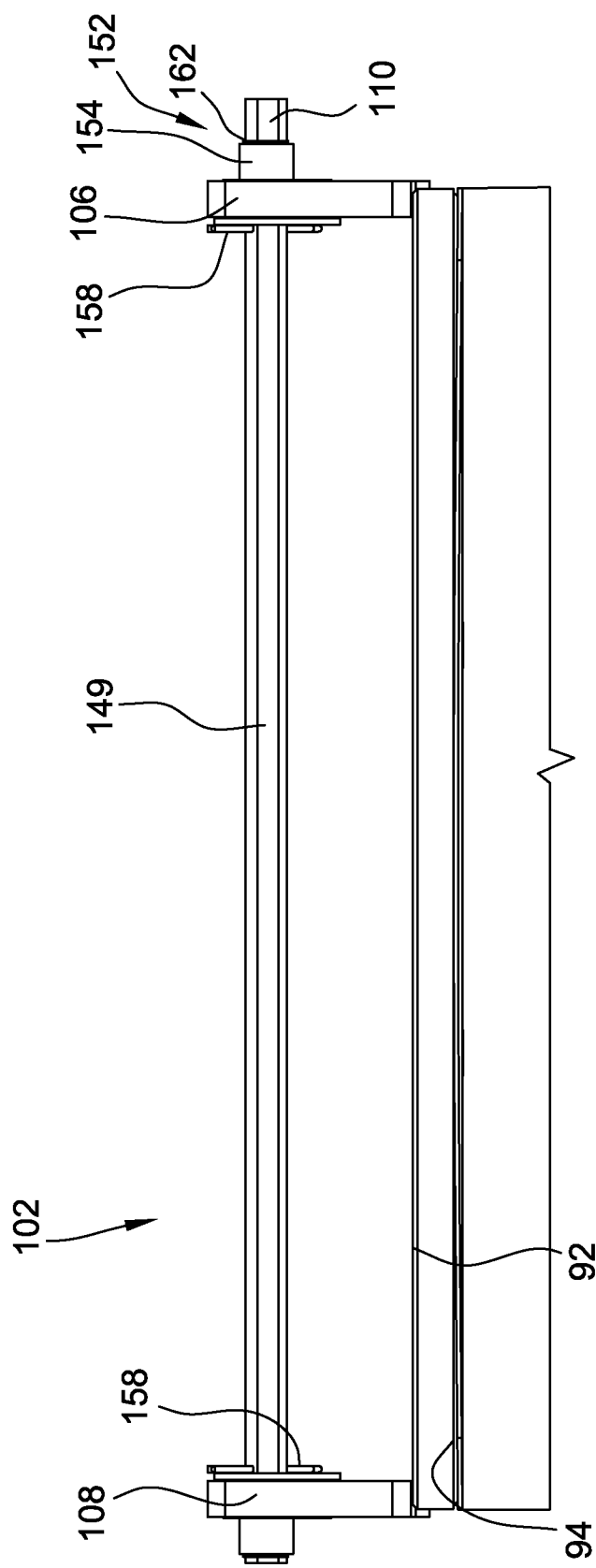
FIG. 8 is a front view of the clamping system.

The clamping system 102 includes a shaft retention system 152 (FIGS. 6-8) that guides and retains the components of the clamping system 102 in their correct positions within the shaker assembly 88. In the illustrated embodiment, a shaft pilot 154 extends through each of the shaft holes (indicated generally by "155"). A bushing 156 is positioned within and contacts each shaft pilot 154. Each bushing 156 is configured to receive an end of one of the clamping shafts 148, 149. A cotter pin 158 (FIG. 7) extends through the clamping shafts 148, 149 along an inner face 164 of each of the respective rotatable cams 128, 130, 132, 134 to inhibit the respective clamping shaft from being withdrawn outward from the clamping system 102. A snap ring 162 (FIG. 6) is positioned around each end of the clamping shafts 148, 149 along an outer face of each of the bushings 156 and is configured to inhibit the respective clamping shaft from being withdrawn inward from the clamping system 102 and/or to inhibit the bushing 156 from being withdrawn outward from the clamping system 102.

In the unclamped position (FIG. 9), the crown CR of the cam is at a first position. During clamping, the first actuator interface 110 and second actuator interface 112 are each engaged to turn the shafts 148, 149 and rotate the cams 128, 130, 132, 134. Rotation of the cams 128, 130, 132, 134 moves the crown CR to a second position that is lower than the first position causing the clamping bars 106, 108 to move lower to the clamped position (e.g., to deflect the clamping bars 106, 108 so as to increase the radius of curvature of each bar). The clamping bars 106, 108 are held in the clamped position by the frictional force between the bushings 156 and the shaft pilots 154. In some embodiments, the cams 128, 130, 132, 134 are configured to be moved over center relative to the shaker motion during clamping which further tensions the vibratory screen 92 during operation of the shaker assembly 88.

The slotted through-hole 122 in each clamping bar 106, 108 enables the clamping bar 106, 108 to move back and forth as each shaft 148, 149 is rotated. The first shaft 148 may be actuated before the second shaft 149 to allow the bars 106, 108 to move across the second and fourth cams 130, 134 (i.e., relative movement between each cam 130, 134 within its respective through-hole 122) as the length changes during deflection elongation and/or to adjust for any manufacturing tolerance variation. In some embodiments, the clamping system 102 includes one or more locking devices (not shown) to hold the clamping bars in the clamped position. In some embodiments, the outer surface 136 of each cam includes a flat surface (not shown). Contact of the flat surface and the clamping bar may indicate to an operator that the screens are sufficiently clamped and/or prevents counter-rotation of the cam to the unclamped position.

In some embodiments, the clamping system 102 includes a protective seal or cover to reduce or prevent material or debris from filling and/or contaminating a gap formed between a cam 128, 130, 132, and the respective bar 106, 108. Alternatively, or in addition to the seals or covers, both ends of the bar 106, 108 may be slotted.

As the vibratory screen 92 (FIG. 1) vibrates, effluent falls through the openings within the vibratory screen 92 and into a catchpan 115 (FIG. 17). Particles that do not fit through the openings vibrate to the solids discharge end 64 of the shaker assembly 88. The shaker assembly 88 may include a pre-screen 104 (FIG. 1) that first engages material loaded onto the shaker assembly 88. In the illustrated embodiment, the pre-screen 104 has a plurality of slats 109 (FIG. 4) with openings formed between slats 109 through which material falls. In other embodiments, the openings of the pre-screen 104 have other shapes (circular, rectangular, and the like). The pre-screen 104 may have relatively large openings (e.g., at least about 0.5 inches, at least about 1 inch, at least about 1.5 inches, or 2 inches or more) such that relatively large material is prevented from passing through the pre-screen 104. The slats 109 have ribs 111 (FIG. 2) which reinforce the slats 109. The pre-screen 104 may be angled with respect to the vibratory screen 92 as shown or may be parallel to the screen 92.

The pre-screen 104 may be adapted to withstand the impact of large stones and earthen material. Example screens include screens that may be referred to by those of skill in the art as a "grizzly screener" or simply "grizzly." The pre-screen 104 may vibrate or, as in other embodiments, does not vibrate.

The openings of the vibratory screen 92 are of a smaller size than the openings of the pre-screen 104. In some embodiments, the size of the openings of the vibratory screen 92 are less than 250 micron, less than about 150 micron or less than about 100 micron. The ratio of the size of the openings of the pre-screen 104 to the size of the openings of the vibratory screen 92 may be at least about 100:1, at least about 250:1, or even at least about 500:1. In some embodiments, the vibratory screen 92 is divided into multiple segments 190 that can separately be changed out for maintenance. The listed size of the openings and ratios thereof are exemplary and other ranges may be used unless stated otherwise.

Figure 13:
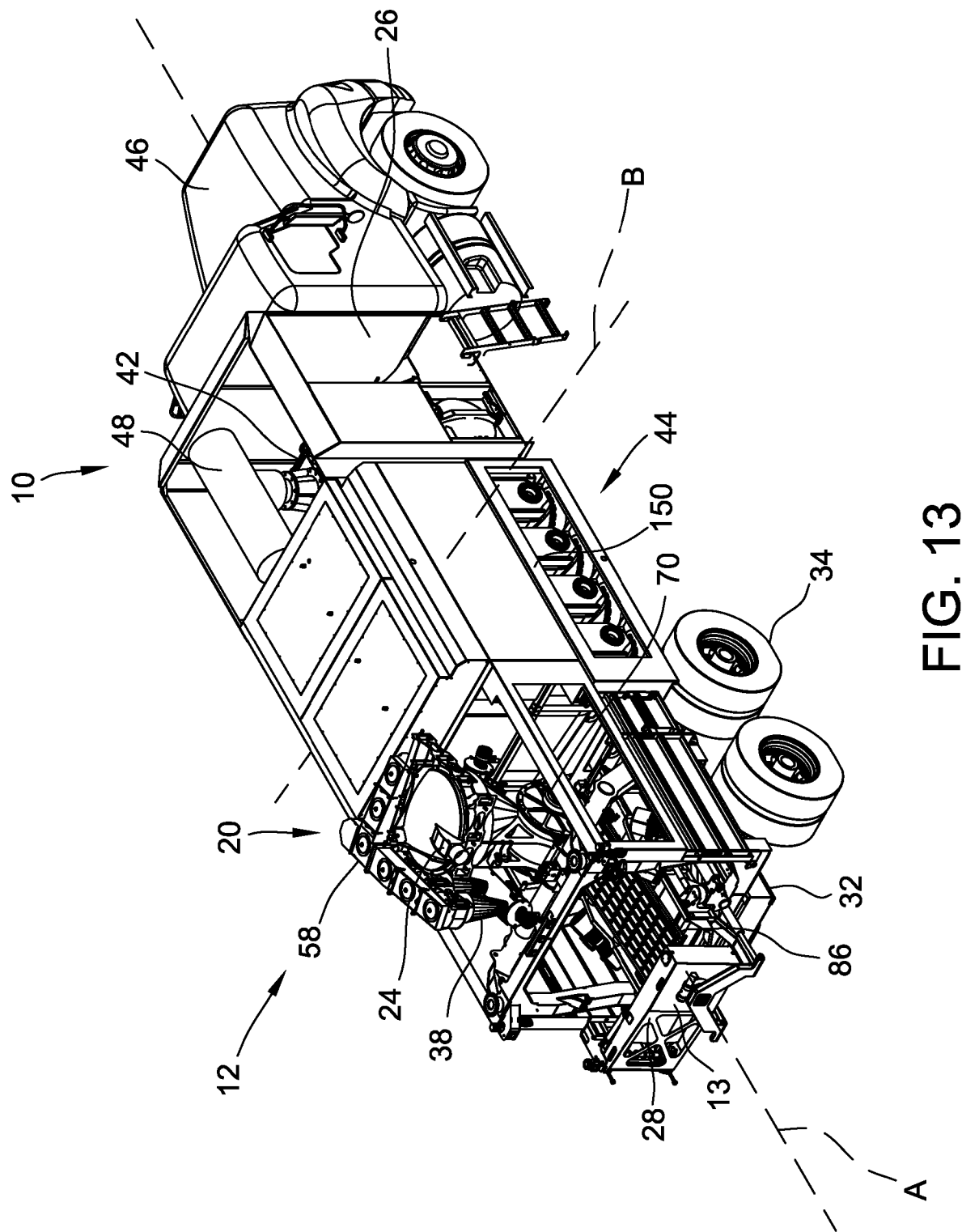
FIG. 13 is a perspective view of a vacuum truck including a hydro excavation vacuum apparatus with the conveyor in a transit position.
Figure 14:
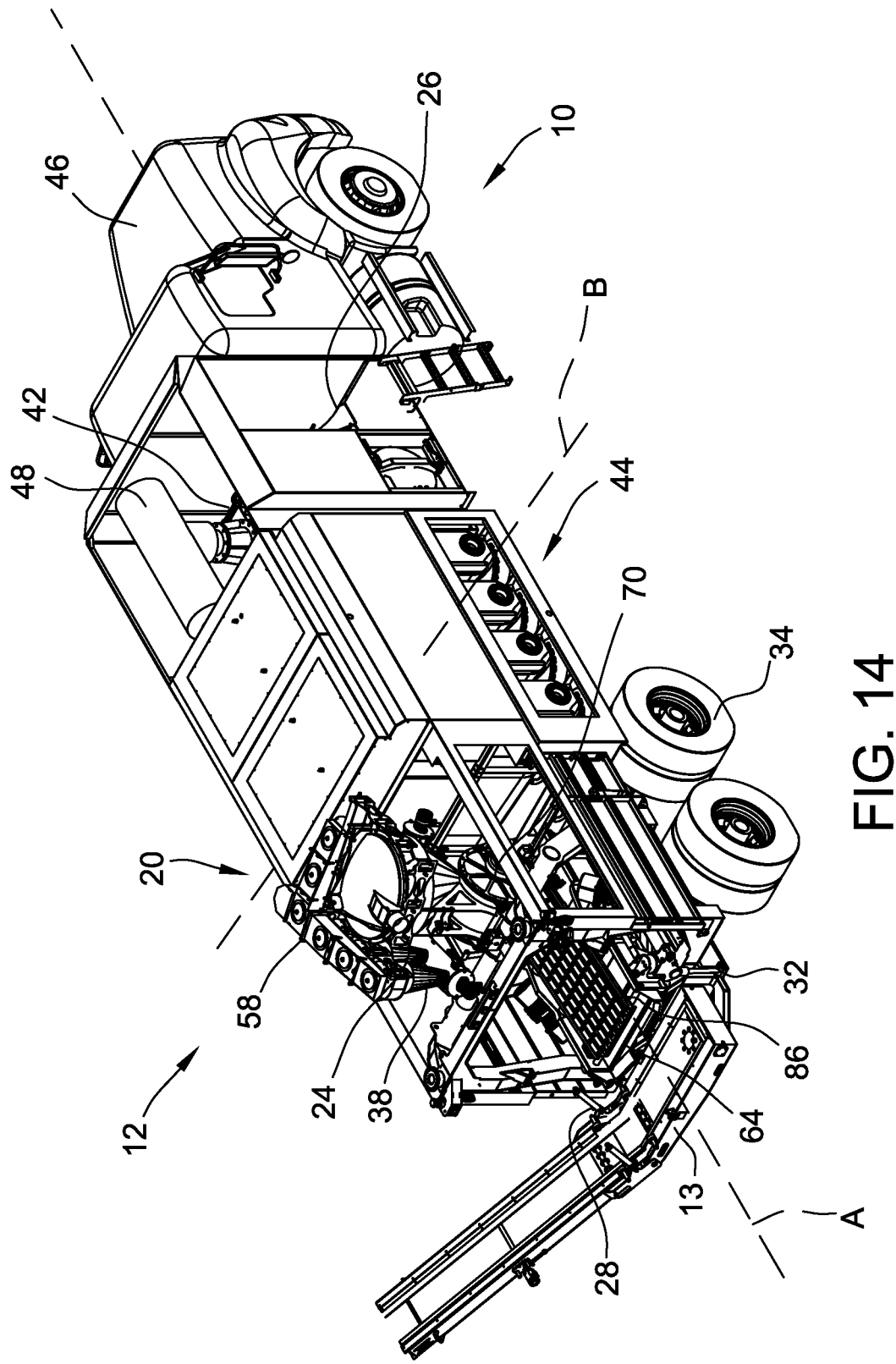
FIG. 14 is a perspective view of the vacuum truck and the hydro excavation vacuum apparatus with the conveyor extended.
Figure 15:
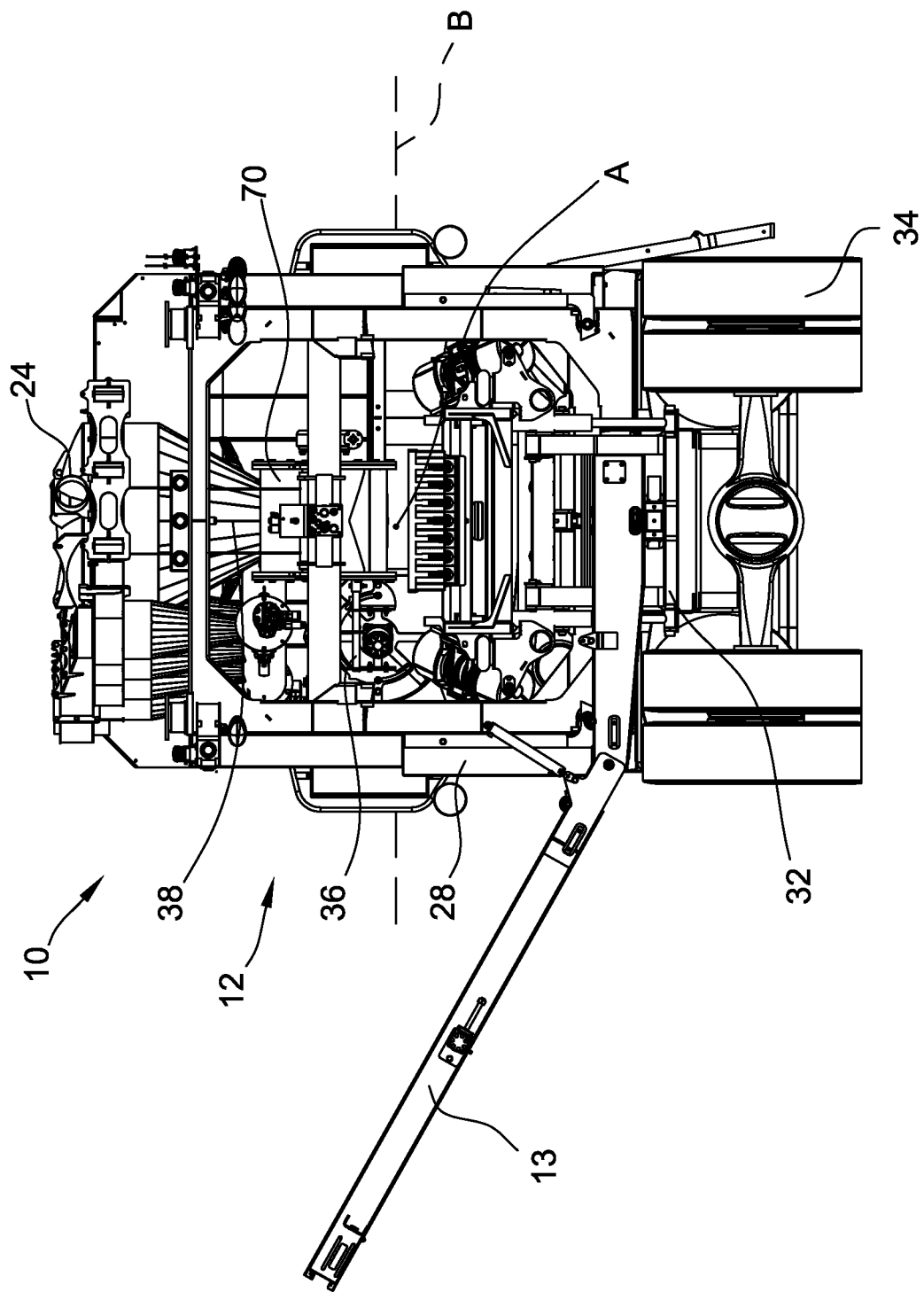
FIG. 15 is a rear view of the vacuum truck and the hydro excavation vacuum apparatus with the conveyor extended.
Figure 16:
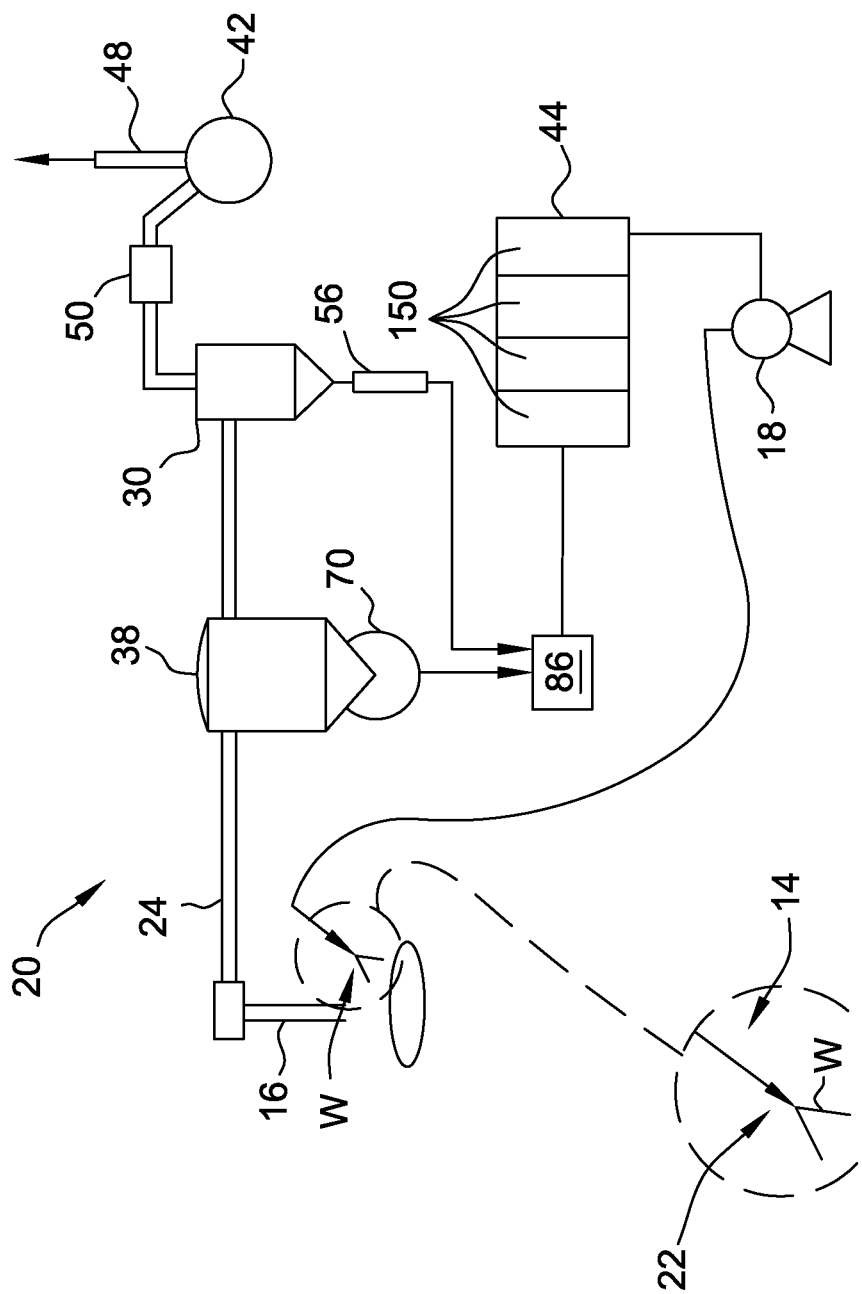
FIG. 16A is a schematic of water and air flow in the hydro excavation vacuum apparatus.
FIG. 16B is a schematic of the wand of the hydro excavation vacuum apparatus.

Referring now to FIG. 13, the shaker assembly 88 may be part of a hydro excavation vacuum apparatus 12 such as a hydro excavation vacuum apparatus 12 onboard a vacuum truck 10. Alternatively, the shaker assembly 88 may be a component of a drilling fluid processing system or "reclaimer" system such as the reclaimer system 160 shown in FIG. 19. In some embodiments, the shaker 88 is used to dewater dredge material or to size aggregate.

The hydro excavation vacuum apparatus 12 is used to excavate a site by use of a jet of high pressure water expelled through a wand. The cut earthen material and water are removed by a vacuum system and are processed onboard the hydro excavation vacuum apparatus by separating the cut earthen material from the water. Processed water may suitably be used for additional excavation or disposed. Recovered earthen material may be used to backfill the excavation site or disposed of.

The vacuum truck 10 described herein and shown in FIGS. 13-17 is an example vacuum truck. Generally any vacuum truck 10 that operates by hydro vacuum operation with on-board processing of cut earth and water may be used unless stated otherwise. Another example vacuum truck is disclosed in U.S. Provisional Patent Application No. 62/532, 853, filed Jul. 14, 2017, entitled "Hydro Vacuum Excavation Apparatus," which is incorporated herein by reference for all relevant and consistent purposes. The vacuum truck 10 of the present disclosure may be operated as disclosed in U.S. Provisional Patent Application No. 62/532,853 and/or may include any of the processing units described therein.

A chassis 32 supports the various excavation vacuum components (e.g., vacuum system, separation vessel, airlock and/or dewatering system) with wheels 34 connected to the chassis 32 to transport the hydro excavation vacuum apparatus 12. The hydro excavation vacuum apparatus 12 may be self-propelled (e.g., with a dedicated motor that propels the hydro excavation vacuum apparatus), as in the present example, or may be adapted to be towed by a separate vehicle (e.g., may include a tongue and/or hitch coupler to connect to the separate vehicle).

The various components of the hydro excavation vacuum apparatus 12, such as the excavation pump, vacuum pump, shaker assembly, conveyors and the like, and conveyor assembly for carrying away material exiting the hydro excavation vacuum apparatus, are powered by a motor 46. In the illustrated embodiment, the motor 46 also propels the hydro excavation apparatus 12. In other embodiments, the hydro excavation vacuum apparatus 12 includes a dedicated engine separate from the motor that propels the hydro excavation vacuum apparatus or the hydro excavation vacuum apparatus 12 is powered by other methods.

The hydro excavation vacuum apparatus 12 includes a front 26, rear 28, and a longitudinal axis A (FIGS. 13-14) that extends through the front 26 and rear 28 of the hydro excavation vacuum apparatus 12. The hydro excavation vacuum apparatus 12 includes a lateral axis B that is perpendicular to the longitudinal axis A.

The hydro excavation vacuum apparatus 12 includes a wand 14 (FIG. 16B) for directing pressurized water W toward earthen material to cut the earthen material. The wand 14 is connected to an excavation fluid pump 18 that supplies water to the wand 14. The excavation fluid pump 18 may supply a pressure of, for example, at least about 500 psi or at least about 1,000 psi (e.g., from about 1,000 psi to about 5,000 psi or from 1,000 psi to about 3,000 psi).

In some embodiments, the wand 14 includes a rotary nozzle 22 (FIG. 16B) for directing water W toward the earthen material to cut the earthen material. Generally, any rotary nozzle that causes the water to be directed toward the earthen material in a circular and random path at the site of the excavation may be used. In other embodiments, a straight tip nozzle that directs fluid along a straight path in a concentrated jet may be used.

The hydro excavation vacuum apparatus 12 includes a vacuum system 20 for removing spoil material from the excavation site. Spoil material or simply "spoils" may include, without limitation, rocks, cut earthen material (e.g., small particulate such as sand to larger pieces of earth that are cut loose by the jet of high pressure water), slurry, and water used for excavation. The spoil material may have a consistency similar to water, a slurry, or even solid earth or rocks. The terms used herein for materials that may be processed by the hydro excavation vacuum apparatus 12 such as, for example, "spoils," "spoil material," "cut earthen material" and "water", should not be considered in a limiting sense unless stated otherwise.

The vacuum system 20 includes a boom 24 that is capable of rotating toward the excavation site to remove material from the excavation site. The boom 24 may include a flexible portion 16 (FIG. 16A) and/or a solid portion that extends downward to the ground to vacuum spoil material from the excavation site. The flexible portion 16 may be manipulated manually by a user to direct the vacuum suction toward the excavation site. The boom 24 may be manipulated manually or powered, such as hydraulically or the like.

The vacuum system 20 acts to entrain the cut earth and the water used to excavate the site in a stream of air. A blower or vacuum pump 42 (FIG. 16A) pulls a vacuum through the boom 24 to entrain the material in the airstream. Air is discharged from the vacuum pump 42 after material is removed from the airstream. A filter 50 may be positioned upstream of the vacuum pump 42.

The airstream having water and cut earth entrained therein is pulled through the boom 24 and through a series of conduits and is pulled into a separation vessel 38. The separation vessel 38 removes at least a portion of cut earthen material and water from the airstream. Air exits the separation vessel 38 and is introduced into one or more cyclones 30 (FIG. 16A) to remove additional spoil material (e.g., water, small solids such as sand, low density particles such as sticks and grass, and the like) not separated in the separation vessel 38. Material that collects in the bottom of the cyclones 30 may be conveyed by an auger 56 to a cyclone discharge pump 36 (FIG. 15) (e.g., peristaltic pump). The air removed from the cyclones 30 is introduced into one or more filter elements 50 before entering the vacuum pump 42. The vacuum pump 42 generates vacuum in the system to pull water and cut earthen material into the hydro excavation vacuum apparatus 12 for processing. Air is removed from the hydro excavation vacuum apparatus through a vacuum exhaust 48.

The separation vessel 38 and cyclones 30 are part of a separation system 58 for removing spoil material from the airstream. The separation vessel 38 is a first stage separation in which the bulk of spoil material is removed from the airstream with carryover material in the airstream being removed by the cyclones 30 in a second stage and by the filter elements 50 in a third stage (i.e., the separation vessel 38 is the primary separation vessel with the downstream cyclones 30 being secondary separation vessels and the filter elements 50 being a tertiary separation vessel).

Spoil material containing water and cut earth is introduced into the separation vessel 38. The separation vessel 38 may be a deceleration vessel in which the velocity of the airstream is reduced causing material to fall from the airstream toward a bottom of the separation vessel 38 (e.g., by gravity with reduced or no vortexing). In other embodiments, a separation vessel 38 using cyclonic separation (i.e., a cyclone) in which airflow travels in a helical pattern is used to remove material from the airstream. At least a portion of spoil material falls from the airstream into an airlock 70 (FIG. 17).

Figure 18:
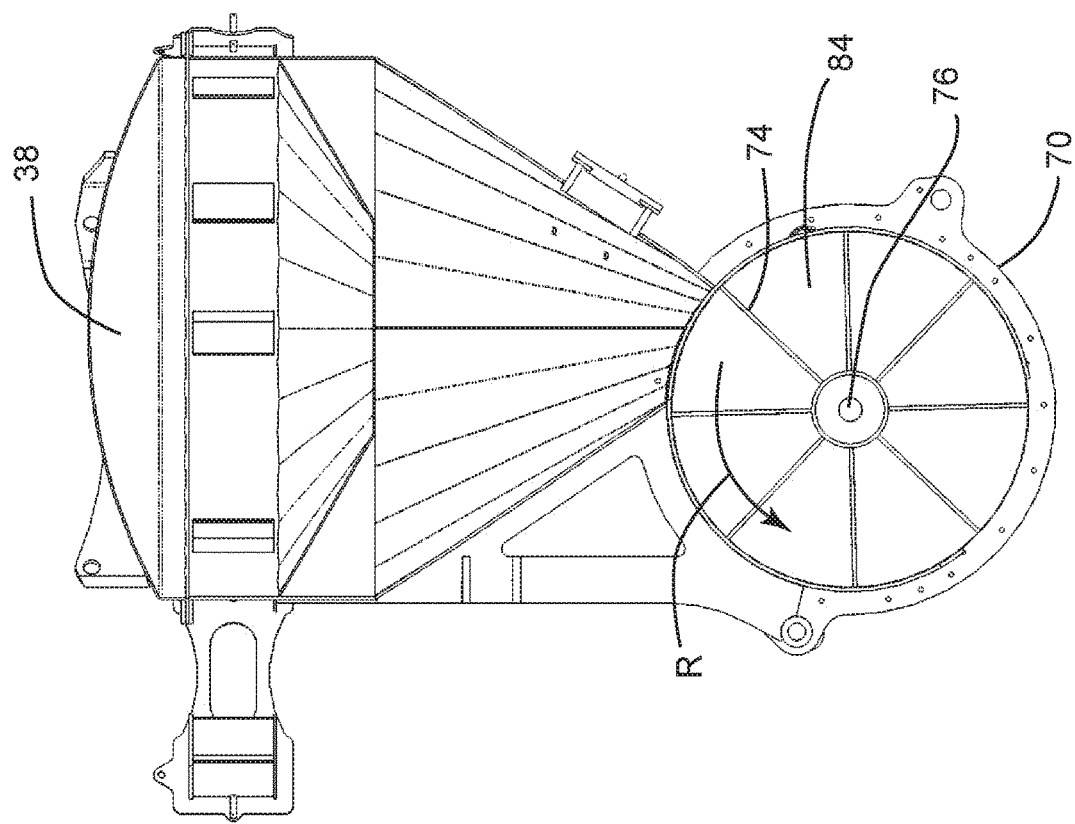
FIG. 18 is a cross section of an airlock of the hydro excavation vacuum apparatus.

The airlock 70 includes a plurality of rotatable vanes 74 (FIG. 18) connected to a shaft 76. The vanes 74 rotate along a conveyance path in the direction shown by arrow R in FIG. 17. The shaft 76 is connected to a motor 72 that rotates the shaft 76 and vanes 74 within a housing 78. Two adjacent vanes 74 collectively form a pocket 84 which receives spoil material.

Material passes from the separation vessel 38 into the airlock 70 and water and cut earthen material are discharged from the airlock 70 and introduced into the dewatering system 86. In some embodiments, the water and cut earthen material are directly introduced into the dewatering system 86 (e.g., directly fed to the shaker assembly 88).

The dewatering system 86 includes the shaker assembly 88 and, optionally, additional dewatering units (e.g., flatwire conveyor belts, cyclones such as desander and/or desilter cyclones and centrifuges such as the centrifuges disclosed in U.S. Pat. No. 7,523,570 which is incorporated herein for all relevant and consistent purposes). Solids that reach the solids discharge end 64 of the shaker assembly 88 fall onto the conveyor assembly 13 (FIGS. 13-15) and may be conveyed away from the hydro excavation vacuum apparatus 12 to form a stack of solids. Solids may be loaded into a bin, dumpster, loader bucket, ground pile, roll-off bin, dump truck or the like or may be conveyed to the site of the excavation as backfill. Solids may be transported off of the hydro excavation vacuum apparatus 12 by other methods. Liquid that passes through the vibratory screen 92 collects in a catchpan 115 (FIG. 17) and is conveyed to a fluid storage and supply system 44.

The hydro excavation vacuum apparatus 12 includes a fluid storage and supply system 44 (FIGS. 13-14) which supplies water for high pressure excavation and stores water recovered from the dewatering system 86. The fluid storage and supply system 44 may include a plurality of vessels 150 for holding fluid.

Figure 19:
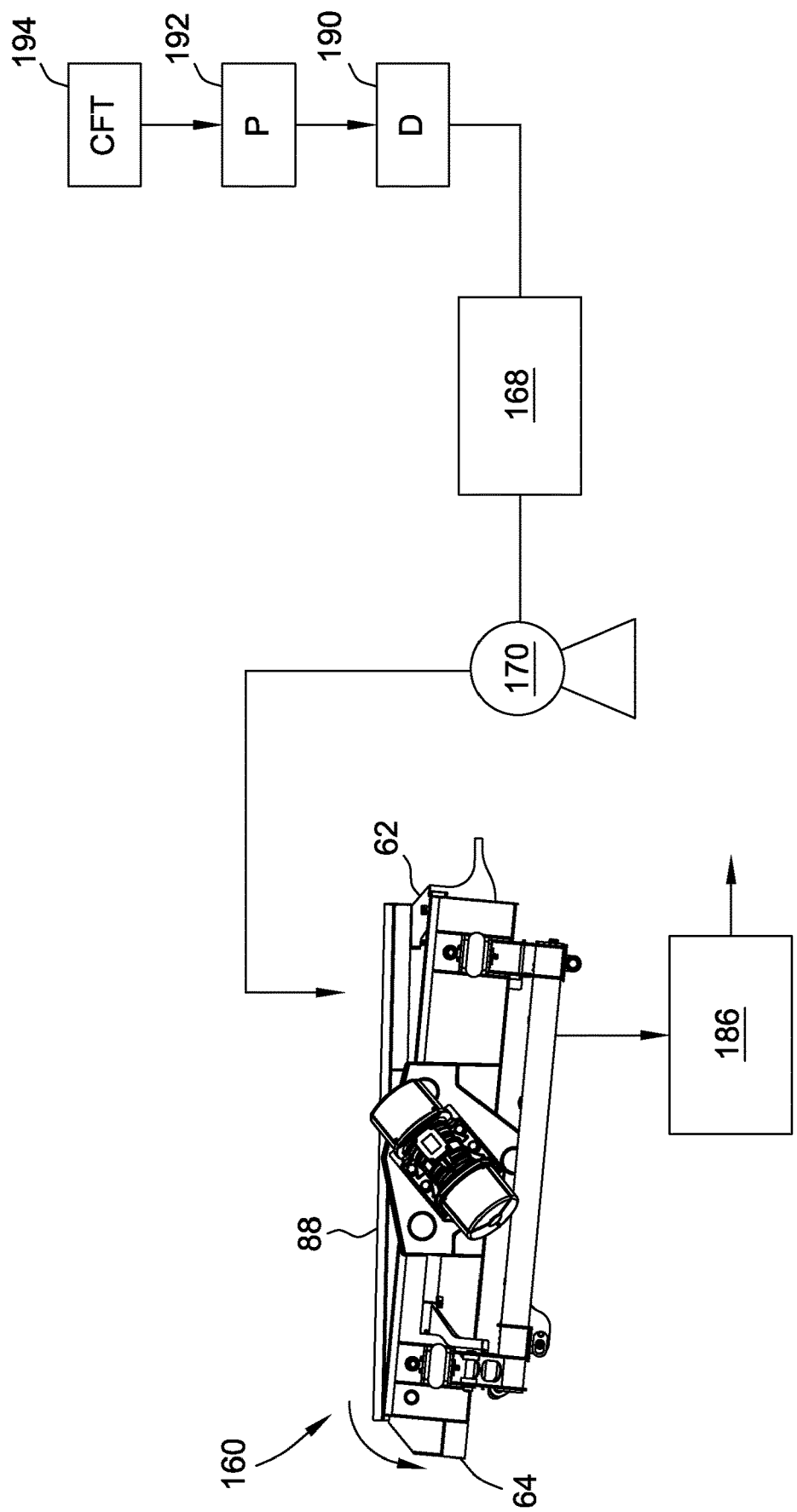
FIG. 19 is a schematic of a drilling fluid reclaimer system.

In some embodiments, the shaker assembly 88 is a component of a drilling fluid processing system or "reclaimer" system such as the reclaimer system 160 shown in FIG. 19. Such reclaimer systems are configured to remove at least some of the solid particulate/cuttings generated during drilling from used drilling fluid.

Generally, any source of drilling fluid may be processed in the reclaimer system 160. In the illustrated embodiment, the drilling fluid is received from a drilling system 190. One or more pumps 192 feeds clean drilling fluid from a clean drilling fluid vessel 194 into the drilling system 190. Drilling fluid from the drilling system 190 is fed to a spent drilling fluid storage vessel 168 and is pumped to the shaker assembly 88. In other embodiments, the spent drilling fluid storage vessel 168 and/or pump 170 is eliminated and drilling fluid is sent directly to the shaker assembly 88.

The shaker assembly 88 catches solids in the used drilling fluid while allowing drilling fluid to pass through the shaker assembly 88. In the illustrated embodiment, the shaker assembly is sloped upward from the loading end 62 to the solids discharge end 64. In other embodiments, the shaker assembly 88 is sloped downward from the loading end 62 to the solids discharge end 64. Liquid that passes through the shaker assembly 88 is collected and, optionally, may be introduced into a downstream processing system 186 (e.g., one or more cyclones).

The reclaimer system 160 may include additional processing units 186 that may operate in parallel or in series (e.g., two, three or four or more shaker assemblies 88). Embodiments of the reclaimer system 160 may include other processing units that pre-process or post-process the used drilling fluids including, for example, settling tanks, hydroclones (e.g., desander cyclones and/or desilter cyclones), additive storage, mixers and centrifuges such as the centrifuges disclosed in U.S. Pat. No. 7,523,570).

Compared to conventional shaker screen clamping assemblies, the shaker screen clamping assemblies described herein have several advantages. Use of an apparatus to rapidly and effectively clamp the vibratory screen to the vibratory frame for operational use and to rapidly unclamp the vibratory screen for replacement of the vibratory screen reduces the time to replace the vibratory screen and improves retention of the vibratory screen during operation of the shaker assembly. The clamping system may include a clamping bar extending along a side of the vibratory screen and a rotatable cam contacting the clamping bar during rotation of the cam to move the clamping bar between an unclamped position in which the vibratory screen is not secured against the mounting surface and may be withdrawn from the vibratory frame, and a clamped position in which the vibratory screen is secured against the mounting surface and ready for operational use. This arrangement allows the vibratory screen to be rapidly and effectively clamped and unclamped (such as by use of an actuator such as a wrench), which reduces the time required to replace a vibratory screen and return the hydro excavation vacuum apparatus to service. In some embodiments, a pair of clamping bars extends along each side of the vibratory screen and is coupled together by a pair of clamping shafts extending between a pair of cams positioned within each of the clamping bars. The vibratory screen may be secured by simply rotating both clamping shafts (i.e., clamping at only two locations). In embodiments in which the clamping bar includes a slotted through-hole, the slotted through hole may allow the clamping bar to move forward and/or back during rotation of the clamp shafts. In embodiments in which the clamping bars are concave in the unclamped position, deflection during clamping provides a clamping pressure along the vibratory screen along the length of the clamping bar. Both clamping shafts may be actuated from the same side of the shaker assembly which allows the system to be more compact (e.g., with limited access to one side of the shaker assembly).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A shaker assembly for dewatering material comprising:
   a vibratory screen;
   a vibratory frame having a mounting surface for supporting the vibratory screen, the vibratory screen being disposed on the mounting surface;
   a clamping bar extending along a side of the vibratory screen, the vibratory screen being disposed between the mounting surface and the clamping bar; and
   a rotatable cam contacting the clamping bar during rotation of the cam to move the clamping bar between an unclamped position in which the vibratory screen is not secured against the mounting surface and a clamped position in which the vibratory screen is clamped between the mounting surface and the clamping bar.

2. The shaker assembly as set forth in claim 1 wherein the cam includes an outer surface that contacts the clamping bar during rotation of the cam, the cam being an eccentric cam or a non-symmetric cam.

3. The shaker assembly as set forth in claim 1 wherein the clamping bar includes a through-hole, the rotating cam being received in the through-hole.

4. The shaker assembly as set forth in claim 1 wherein the cam is a first cam, the shaker assembly comprising a second rotatable cam contacting the clamping bar during rotation of the second cam to move the clamping bar between an unclamped position in which the vibratory screen is not secured against the mounting surface and a clamped position in which the vibratory screen is secured against the mounting surface.

5. The shaker assembly as set forth in claim 4 wherein the clamping bar comprises:
   a first through-hole, the first cam being received in the first through-hole, the first through-hole being slotted and having a height that is substantially the same as a diameter of the cam and a length that is wider than the diameter of the cam; and
   a second through-hole, the second cam being received in the second through-hole, the second through-hole being circular and having a diameter substantially the same as the diameter of the second cam.

6. The shaker assembly as set forth in claim 1 wherein the clamping bar is a first clamping bar that extends along a first side of the vibratory screen and the cam is a first cam, the shaker assembly further comprising:
   a second clamping bar that extends along a second side of the vibratory screen, the second side being opposite from the first side; and
   a second rotatable cam contacting the second clamping bar during rotation of the second cam to move the second clamping bar between an unclamped position in which the vibratory screen is not secured against the mounting surface and a clamped position in which the vibratory screen is secured against the mounting surface.

7. The shaker assembly as set forth in claim 1 wherein the clamping bar is a first clamping bar that extends along a first side of the vibratory screen and the cam is a first cam, the shaker assembly further comprising:
   a second rotatable cam contacting the first clamping bar during rotation of the second cam to move the first clamping bar between an unclamped position in which the vibratory screen is not secured against the mounting surface and a clamped position in which the vibratory screen is secured against the mounting surface;
   a second clamping bar that extends along a second side of the vibratory screen, the second side being opposite from the first side;
   a third rotatable cam contacting the second clamping bar during rotation of the third cam to move the second clamping bar between an unclamped position in which the vibratory screen is not secured against the mounting surface and a clamped position in which the vibratory screen is secured against the mounting surface; and
   a fourth rotatable cam contacting the second clamping bar during rotation of the fourth cam to move the second clamping bar between an unclamped position in which the vibratory screen is not secured against the mounting surface and a clamped position in which the vibratory screen is secured against the mounting surface.

8. The shaker assembly as set forth in claim 7 wherein the first cam is opposite the third cam and the second cam is opposite the fourth cam, the shaker assembly further comprising:
   a first clamping shaft extending between the first and third cams and configured such that rotation of the first clamping shaft causes the first and third cams to rotate; and
   a second clamping shaft extending between the second and fourth cams and configured such that rotation of the second clamping shaft causes the second and fourth cams to rotate.

9. The shaker assembly as set forth in claim 1 wherein the vibratory screen comprises separable screen segments that are secured against the mounting surface by the clamping bar when the clamping bar is in the clamped position.

10. The shaker assembly as set forth in claim 1 wherein the clamping bar extends at least partially along a side of the vibratory screen.

11. The shaker assembly as set forth in claim 1 further comprising:
    a subframe that supports the vibratory frame, the subframe being disposed below the vibratory frame; and a vibrating motor connected to the vibratory frame for vibrating the vibratory screen.

12. The shaker assembly as set forth in claim 1 wherein the clamping bar has a mounting surface that contacts the vibratory screen during clamping, the mounting surface being convex in the unclamped position of the clamping bar, the clamping bar being configured to increase a radius of curvature of the clamping bar as the clamping bar moves from the unclamped to the clamped position.

13. A clamping system for securing a vibratory screen comprising:
    a mounting surface for supporting the vibratory screen;
    a clamping bar for securing the vibratory screen to the mounting surface;
    a rotatable cam that rotates to cause the clamping bar to move to a clamping position to secure the vibratory screen to the mounting surface; and
    a shaft connected to the rotatable cam, the shaft being rotatable to cause the cam to rotate.

14. The clamping system as set forth in claim 13 wherein the clamping bar is a first clamping bar, the rotatable cam is a first cam, and the shaft is a first shaft, the clamping system further comprising:
    a second rotatable cam that rotates to cause the first clamping bar to move to the clamping position to secure the vibratory screen to the mounting surface;
    a second clamping bar for securing the vibratory screen to the mounting surface;
    a third rotatable cam that rotates to cause the second clamping bar to move to a clamping position to secure the vibratory screen to the mounting surface, the first shaft being connected to the third cam, the first shaft being rotatable to cause the cam to rotate; and
    a forth rotatable cam that rotates to cause the second clamping bar to move to the clamping position to secure the vibratory screen to the mounting surface; and
    a second shaft connected to the second and fourth cams, the second shaft being rotatable to cause the second and fourth cams to rotate.

15. A shaker assembly for dewatering material comprising:
    the clamping system of claim 13;
    a screen disposed between the mounting surface and the clamping bar; and
    a vibratory frame that defines the mounting surface, the shaft being connected to the vibratory frame.

\* \* \* \* \*